(12) United States Patent
Gattu et al.

(10) Patent No.: US 11,531,658 B2
(45) Date of Patent: *Dec. 20, 2022

(54) CRITERION-BASED RETENTION OF DATA OBJECT VERSIONS

(71) Applicant: Amazon Technologies, Inc., Seattle, WA (US)

(72) Inventors: Praveen Kumar Gattu, Redmond, WA (US); Aykud Gonen, Seattle, WA (US); Jonathan Jorge Nadal, Seattle, WA (US); Abhilasha Seth, Seattle, WA (US); Joseph Thomas Selman, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,790

(22) Filed: Dec. 9, 2019

(65) Prior Publication Data
US 2020/0110733 A1  Apr. 9, 2020

Related U.S. Application Data

(63) Continuation of application No. 14/281,792, filed on May 19, 2014, now Pat. No. 10,503,713.

(51) Int. Cl.
*G06F 7/00* (2006.01)
*G06F 16/21* (2019.01)
*G06F 16/11* (2019.01)

(52) U.S. Cl.
CPC .......... *G06F 16/219* (2019.01); *G06F 16/125* (2019.01)

(58) Field of Classification Search
CPC .. G06F 16/219; G06F 16/2329; G06F 16/116; G06F 16/125
See application file for complete search history.

(56) References Cited

U.S. PATENT DOCUMENTS

| | | | |
|---|---|---|---|
| 7,099,889 B2 | 8/2006 | Berks et al. | |
| 7,496,555 B2 | 2/2009 | Margolus | |
| 7,640,227 B2 | 12/2009 | Kojima | |
| 7,647,329 B1 | 1/2010 | Fischman et al. | |
| 7,716,180 B2 | 5/2010 | Vermeulen et al. | |
| 7,979,397 B2 | 7/2011 | Margolus et al. | |
| 8,316,213 B1 | 11/2012 | Sorenson, III et al. | |

(Continued)

OTHER PUBLICATIONS

U.S. Appl. No. 14/281,785, filed May 19, 2014.

*Primary Examiner* — Mohammed R Uddin
(74) *Attorney, Agent, or Firm* — Davis Wright Tremaine LLP

(57) ABSTRACT

A method and apparatus for criterion-based retention of data object versions are disclosed. In the method and apparatus, a plurality of keys are sorted in accordance with an ordering scheme, whereby a key of the plurality of keys has an associated version of a data object and a timestamp. The key is inspected in accordance with the ordering scheme to determine based at least in part on the timestamp whether a criterion for performing an action on the associated version of the data object is satisfied. If the criterion is satisfied, a marker key is added to the plurality of keys, whereby the marker key precedes the inspected key according to the ordering scheme and indicates that the criterion is satisfied.

20 Claims, 13 Drawing Sheets

(56) References Cited

U.S. PATENT DOCUMENTS

| | | | |
|---|---|---|---|
| 8,468,132 B1 | 6/2013 | O'Neill et al. | |
| 8,504,758 B1 | 8/2013 | McHugh et al. | |
| 8,533,170 B1 | 9/2013 | McHugh et al. | |
| 8,677,083 B1 | 3/2014 | McHugh et al. | |
| 8,838,550 B1 | 9/2014 | Meaney | |
| 8,996,831 B1 | 3/2015 | McHugh et al. | |
| 9,047,312 B1 | 6/2015 | Ten-Pow et al. | |
| 9,280,338 B1 | 3/2016 | Stickle et al. | |
| 2004/0167898 A1* | 8/2004 | Margolus | G06F 16/2358 |
| 2004/0167903 A1 | 8/2004 | Margolus et al. | |
| 2004/0205112 A1 | 10/2004 | Margolus | |
| 2004/0220940 A1 | 11/2004 | Berks et al. | |
| 2005/0076066 A1* | 4/2005 | Stakutis | G06F 16/10 |
| 2006/0010150 A1* | 1/2006 | Shaath | G06F 16/125 |
| 2006/0036448 A1 | 2/2006 | Haynie et al. | |
| 2006/0294053 A1 | 12/2006 | Kojima | |
| 2007/0094312 A1* | 4/2007 | Sim-Tang | G06F 16/125 |
| 2007/0130232 A1* | 6/2007 | Therrien | G06F 11/1471 |
| 2007/0156842 A1 | 7/2007 | Vermeulen et al. | |
| 2007/0255765 A1* | 11/2007 | Robinson | G06F 16/10 |
| 2009/0083056 A1* | 3/2009 | Gole | G06Q 30/0282 |
| | | | 705/347 |
| 2009/0144342 A1* | 6/2009 | Sudhakar | G06F 16/1873 |
| 2011/0106770 A1* | 5/2011 | McDonald | G06F 16/1873 |
| | | | 707/661 |

* cited by examiner

CRITERION-BASED RETENTION OF DATA OBJECT VERSIONS

CROSS-REFERENCE TO RELATED APPLICATIONS

This application is a continuation of U.S. patent application Ser. No. 14/281,792, filed May 19, 2014, entitled "CRITERION-BASED RETENTION OF DATA OBJECT VERSIONS," the disclosure of which is hereby incorporated herein in its entirety. This application also incorporates by reference for all purposes the full disclosure of: co-pending U.S. patent application Ser. No. 14/281,785, filed May 19, 2014, entitled "MANAGING DATA OBJECT VERSIONS IN A STORAGE SERVICE."

BACKGROUND

The use of remote and network-based storage services has proliferated in recent years. Network-based storage services enable users ranging from large organizations to individuals to utilize the storage resource provided by storage services for retaining their data. With network-based storage services users may forego the initial setup costs associated with purchasing storage equipment, such as hard drives, solid state drives and the like. Instead the user may leverage readily available storage resources of a service provider at a fraction of the cost associated with establishing dedicated storage for their data. As a result, users are migrating to network-based storage services for retaining their data.

It is often challenging to configure a storage service to place temporal limits on the retention of various versions of data objects associated pertaining to a user. It is also challenging in a large scale storage service to enforce user-specified policies for the retention of versions of data objects in a computationally efficient manner.

BRIEF DESCRIPTION OF THE DRAWINGS

Various embodiments in accordance with the present disclosure will be described with reference to the drawings, in which.

DETAILED DESCRIPTION

Figure 1:
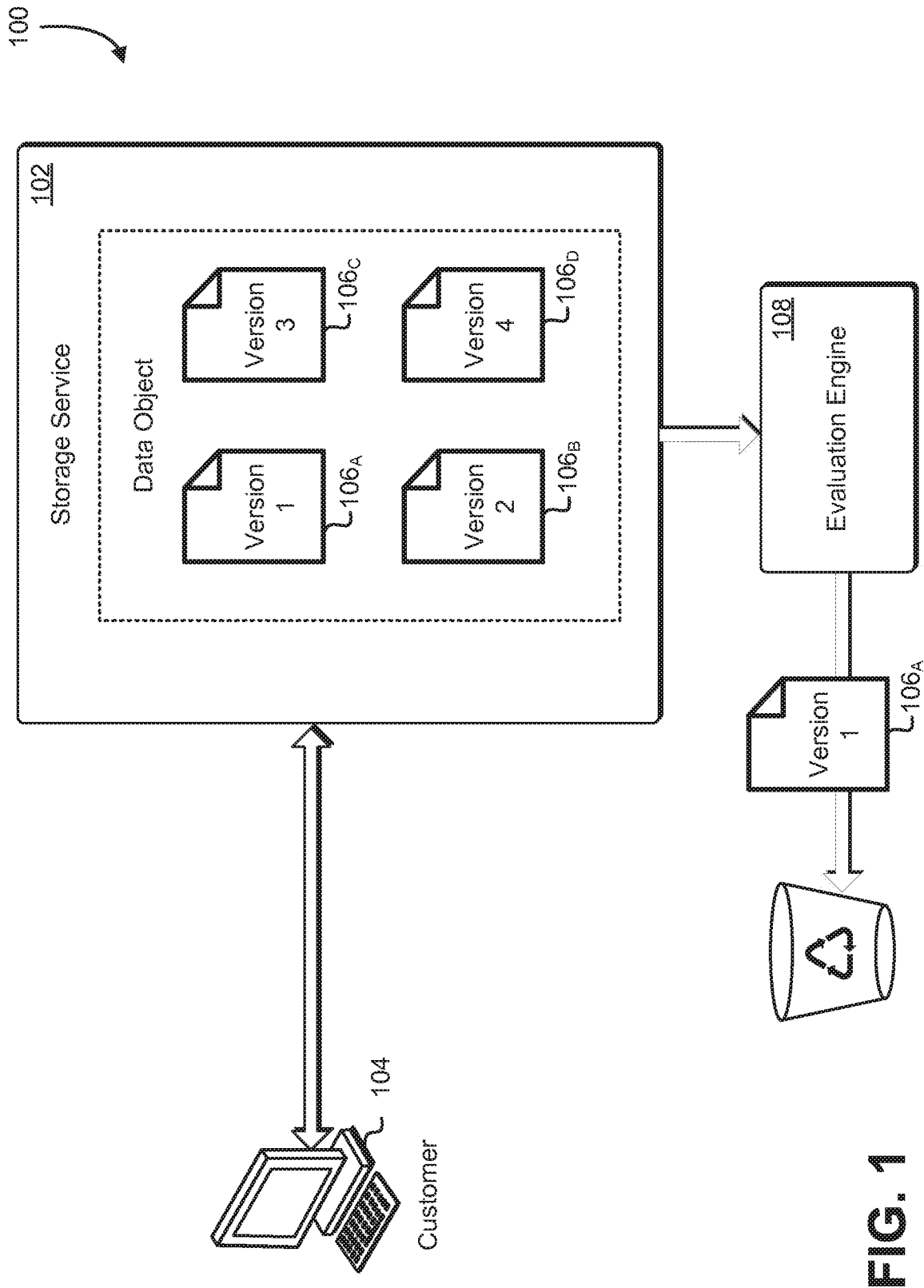
FIG. 1 shows an example of environment for managing storage of data object versions in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include managing versions of a data object in a storage service. A data object that is stored by a storage service may be any piece of information that may be structured in a particular way. For example, the data object may be a computer-readable file that may be represented by a number of bits, bytes or symbols. Further, the data object may be any type of computer-readable code or instructions. A storage service may be responsible for storing the data object, whereby the data object may have one or more versions. The versions of the data object may be various iterations of the data object that may be the same or different in terms of their information content. For example, an entity, such as a customer of the storage service, may designate two data objects as versions of the one data object.

The storage service, which, as described herein, may be any type of entity that is capable of retaining data, may provide functionality that enables a party to which the data object belongs to manage the retention of various versions of the data object. A data object may have any number of non-current versions, whereby a non-current version may be designated accordingly due to the fact that the non-current version was succeeded by another version. If versions of a data object are assigned numeric identifiers that reflect the order of their creation (for example, as determined by the time at which the data object was provided to the storage service for retention), version number 1 of a data object may become non-current as of the creation of version number 2 of the data object. A current version of a data object may be a version that does not have an associated successor version.

The storage service may be configured to enable placing limits on the duration that a version of a data object may be stored in the storage service. Placing the limits may be enabled by providing a customer with the capability to configure a policy to the effect. Accordingly, if the limits are placed, certain versions of a data object may not be stored indefinitely and versions that meet a specified criterion may be deleted, moved to another storage service or otherwise disposed.

A limit (also referred to herein as a non-current timespan) may be placed on the amount of time that a non-current version of a data object may be retained. For a non-current version, a measure of the amount of time that the version spent designated as non-current may be measured. The amount of time may, for example, be measured as the time that elapsed since the creation time of the successor to the non-current version. If the amount of time exceeds the limit, a specified action, such as deletion, may be taken with respect to the non-current version.

Further, the storage service may be configured to permit specifying a second limit that is applicable to a current version of a data object. The second limit (also referred to herein as a current version age) may be placed on the amount of time that a current version may remain designated as such. Following the expiration of the second limit, the current version may be designated as being non-current. Following being designated as non-current, the version is eligible to be evaluated using the non-current timespan limit and, thus, the version may be moved or deleted, among others actions that may be taken.

When configured together, the non-current timespan and the current version age limits result in a temporal recycle bin model, whereby a current version of the data object becomes non-current and enters the recycle bin when the current version age criterion is satisfied or due at least in part to being succeeded by another version. Once in the recycle bin, the non-current version may be retained up to the amount of time specified by the non-current timespan. Upon the expiration of the non-current timespan, the version of the data object may deleted, removed or the like.

To perform criteria evaluation on data object versions in a computationally efficient manner, each version of a data object may be associated with a key, which may, for example, be a string of symbols. The key may be generated so as to enable ordering various keys that are associated with various versions of a data object in accordance with a temporal characteristic of the data object. For example, keys may be sorted in an increasing or decreasing order that also reflects a creation time of associated data object versions. The ordering permits efficiently evaluating various timestamps associated with data object versions to determine whether a specified criterion is met. The ordering further also permits placing keys that are markers for triggering one or more actions to be taken with respect to the data object versions.

FIG. 1 shows an example of environment for managing storage of data object versions in accordance with at least one embodiment. In the environment 100, a storage service 102 retains a plurality of data object versions $106_{A-D}$ (denoted as versions 1-4 and collectively referred to herein by the numeral alone) belonging to a customer 104. The customer 104 may interact with the storage service 102 using appropriately configured functions, such as application programming interface (API) configured function calls, that are made via a network (not shown). The storage service 102 may retain the data object versions 106 and permit the customer to retrieve or modify the data object versions 106.

An evaluation engine 108, which may be a server or host, among others, may be used to determine whether a data object version 106 is eligible for one or more actions to be taken, such as expiration of the data object version 106. The evaluation engine 108 may utilize eligibility criteria that may be specified in an enforced policy associated with the customer 104. For example, the criteria may set forth one or more conditions that are required to be met for a data object version 106 to deleted or relocated to another storage space. As shown in FIG. 1, the evaluation engine 108 determines that version 1 $106_A$ is to be discarded.

Figure 2:
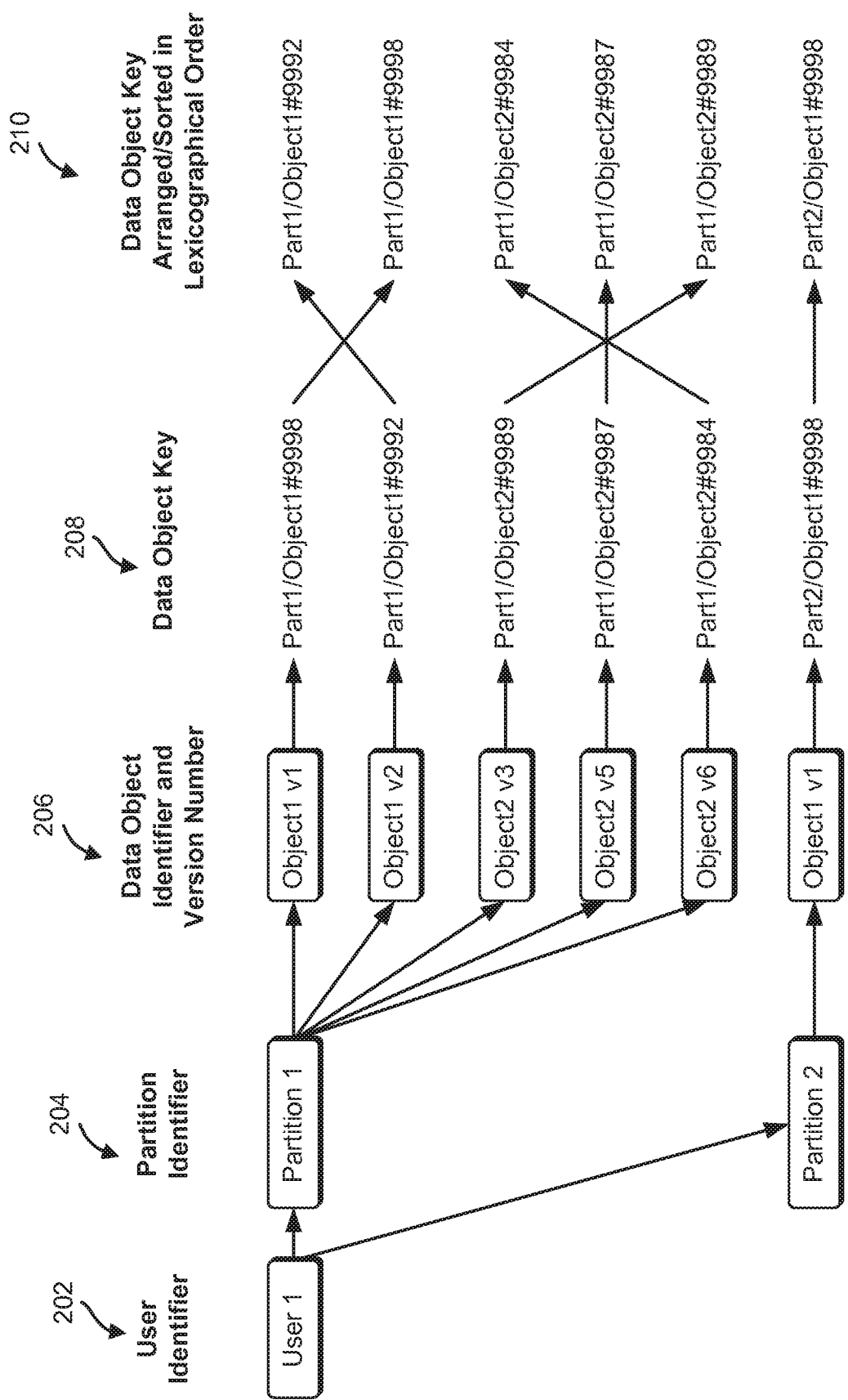
FIG. 2 shows an example of a key structure for data objects in accordance with at least one embodiment.

FIG. 2 shows an example of a key structure for data objects in accordance with at least one embodiment. A user associated with a user identifier 202 has a plurality of partitions that are each identified by partition identifiers 204. The partitions may be used to divide or segment a storage space associated with the user, whereby the storage space may be used for storing in memory one or more data objects. As shown in FIG. 2, a data object may have an associated data object identifier and version number 206. A data object may be any piece of information that may be structured in a particular way, such as, for example, a computer-readable data file. In various embodiments, the data object may be a media file including an audio-visual file, whereby examples of the audio-visual file include a text document, image, audio or video, among others. Further, the data object may be a computer program or code that is configured to operate a computer in a particular way, among many others.

The data objects may be organized in a cataloging structure that references the data objects, whereby examples of the cataloging structure may include a hierarchal file system or a file directory. The cataloging structure may reference the various partitions used for referencing further data objects. The cataloging structure may be useful for locating the data objects. For example, the partitions may be used for organizing the data objects or compartmentalizing the data objects. Further, the partitions may be used for namespace separation among the data objects thus permitting overlapping or matching names among the data objects. Furthermore, the partitions may be useful for access control or security policies, whereby each partition may have an associated access control policy that dictates the type of access that a user may have to data objects of the partition. Examples of a partition include a folder or a drawer in a file system. It is noted that although FIG. 2 is described with reference to data object partitions, it may be contemplated that in various embodiments "flat" or non-hierarchal directories may be used.

Examples of the storage space or storage service used to retain the data structures may include computer storage devices, such as hard drives, solid state drives or random access memory, among others. Further, the storage service may employ the data storage resources provided by a plurality of devices, whereby some of the device may be local storage devices or remote storage device that are accessed via a network. As described herein, the user may be a customer of a storage service and may utilize the storage resources provided by the storage service for persisting the data objects. Access to the data objects may be provided over a network, whereby the user or other users may send, retrieve, modify or delete the data objects. Further, the capability to relocate a data object within a directory or to move the data object to another directory may be provided. The storage service may include networking devices (such as routers or servers) that are used to facilitate access over a network to storage resources that include memory devices, such as hard drives, hard disks, solid state drives and the like.

In addition, the user may create a subsequent version of a data object. For example, if a data object is modified, the user may seek to store the newly modified data object as a new version and in addition to retaining the data object as it was prior to the modification. Versioning offers greater flexibility to users and permits in certain circumstances reverting to a consistent state. Versioning may also be performed serially, whereby multiple subsequent versions of a data object may be created or stored. The various versions of a data object may be enumerated and each version may be associated with a version number, whereby, for example, a first version of a data object may represent an originally provided data object having an associated identifier. The second and subsequent versions of the data object may be identical to or different from the first version but share the same identifier. As used herein, despite the fact that a plurality of versions pertaining to a data object may have each varying data content (for example, bits, bytes, packets, characters or symbols, among others, that are used to represent the version), the versions are said to pertain to the data object if the versions share an identifier with the data object. Further, accordingly it may not be required that the versions of the data object represent the same information as one another or the data object.

Referring to FIG. 2, a data object has a data object identifier and a version number. For example, a first data object (denoted as "Object1") has two versions (denoted as "v1" and "v2"). Further, a second data object (denoted as "Object2") has three versions (denoted as "v1", "v2" and "v3"). In a second partition (denoted as "Partition 2"), a first data object of the partition (also denoted as "Object1") is associated with only one version (denoted as "v1").

Each data object is associated with a data object key 208. The data object key 208 may be assigned to a data object based at least in part on an identity associated with the data object, an identity of the particular version of the data object (for example, version number) or both. The data object key 208 may be string comprising a number of bits or bytes of data. Further, the data object key 208 may be an information element comprising a number of symbols, such as alphanumeric symbols, characters and the like. For example, the data object key 208 may be a representation of both as shown in FIG. 2. The data object key 208 may be used to distinguish between data objects or their respective versions and may be unique to each data object or version thereof. In addition, the data object key 208 may be unique similarly named (for example, similarly identified or referenced) data objects that are associated with or belong to different partitions and the data object key 208 may be generated based at least in part on the partition identifier 204. Furthermore, although not shown in FIG. 2, the data object key 208 may be generated based at least in part on the user identifier 202 associated with the user to which the data object belongs.

The data object key 208 may be used to reference data objects and their associated versions. The data object key 208 may be opaque or unintelligible to a user that may utilize an associated data object identifier and version number 206 in signifying or referencing a data object. Conversely, a system responsible for managing the data objects belonging to the user may utilize the data object key 208 as a way to identify the data object to which the data object key 208 pertains and refer to the data object. Other information, such as the data object identifier and version number 206, partition identifier 204, user identifier 202, data object creation time, among others, may be retained as metadata associated with the data object key 208. For example, if a storage service is responsible for maintaining the data objects of a user, the data object keys of the data objects may be used by a management entity of the storage service to list all data objects pertaining to the user and provide the information to the user. In addition, if the user requests that a data object be moved to another storage service or deleted, the data object key may be used in referring to the data object and enable the functionality.

It is desirable for the data object keys 208 to be ordered, listed or sorted in a computationally efficient manner. It is also desirable for the ordering, listing or sorting of the data object keys 208 to be performed in a manner that reflects version-associated relationships between the data objects. For example, it is desirable for the ordering to reflect the relationship between the enumerated versions of a data object such that the data object keys may be visited in an increasing or decreasing order depending on the sequence of version numbers of the data object.

As shown in FIG. 2, the data object key 208 may be generated based at least in part on a numeric value that is inversely proportional to the version number. Accordingly, when data object keys are listed in an increasing lexicographic order, a later version precedes an earlier version in the lexicographic order and the data object keys may be visited in a reverse order to that of the version numbers of their associated data objects. As described herein, the capability to sort data object keys in the reverse order of their associated version numbers and in a computationally efficient manner is advantageous in that it permits expeditious criteria evaluation.

For example, the numeric value used in the data object key 208 to facilitate lexicographic ordering may be $10^{10}$—version number or $2^{63}$—creation time of the data object version (as measured in Epoch time, which is a numeric value of the number of milliseconds elapsed since Jan. 1, 1970). Although lexicographic ordering and reverse lexicographic ordering, sorting and listing is described herein, it may be contemplated that any other type of ordering, sorting or listing may be used. Further, the data object key 208 may be constructed such that, when ordered according to the scheme, data object keys pertaining to data object versions may be walked through, scanned or inspected in successive (oldest to most recent) or reverse (most recent to oldest) order.

As shown in FIG. 2, due to the fact that the data object key is constructed by concatenating the partition identifier to which the data object belongs along with the data object identifier and a numeric value that is inversely proportional to the version number, the data object keys may be listed in a lexicographically increasing order 210 to sort the versions of each data object from a highest version number (for example, most recent) to the lowest (for example, oldest). Furthermore, a byproduct of the construction of the data object key results in lexicographically ordering the partition identifier as well as the object identifier. Accordingly, partitions are sorted according to the lexicographic order of their identifier and within the partitions, data objects key are sorted according to the lexicographic order of their data object identifiers. It is noted, that although not shown in FIG. 2, the data object key may be generated based at least in part on a user identifier, whereby data objects and their associated versions may be sorted in accordance with the lexicographic order of user identifier to which the data objects belong.

Figure 3:
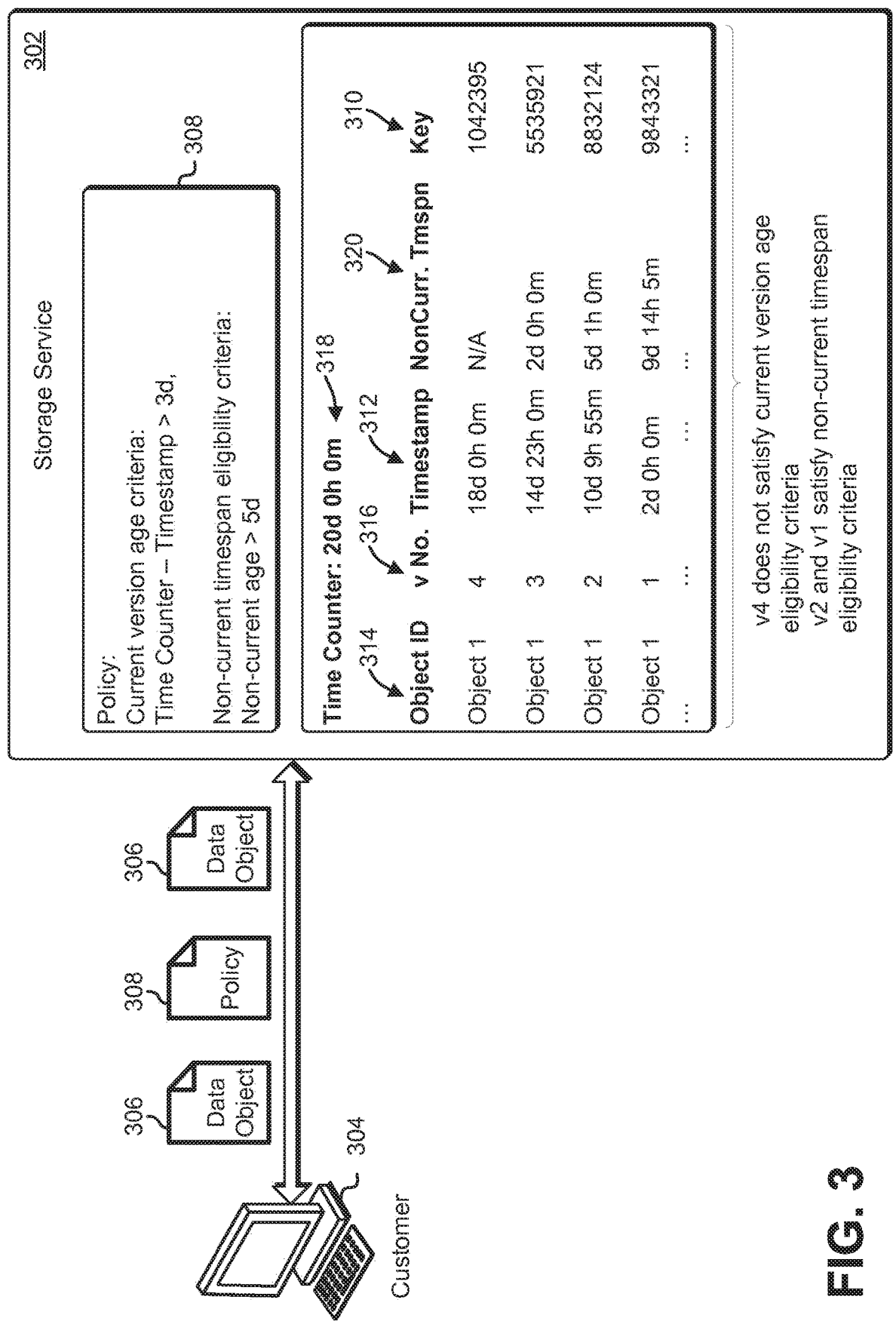
FIG. 3 shows an example of a customer in communication with a storage service in accordance with at least one embodiment.

FIG. 3 shows an example of a customer in communication with a storage service in accordance with at least one embodiment. The customer 304 may communicate with the storage service 302 over a network (not shown) and may utilize the storage resources that are provided by the storage service 302. The customer 304 may be a client of the storage service 302 and may submit service calls (such as appropriately configured application programming interface (API) service calls) to the storage service 302 that cause one or more actions to be taken including providing one or more data objects for storage or retrieving, moving or deleting the one or more data objects, among others. The customer 304 may, for example, be an organization that is responsible for providing computing capability to its employees and uses the storage service 302 to store data objects used by the employees. It is recognized that computing devices of the customer 304, such as hosts or servers, laptop or desktop computers or smartphones or tablets, among others, are configured to communicate on behalf of the customer 304 with the storage service 302. It is also recognized that the embodiments described herein are applicable to other arrangements that those pertaining to a customer service model, whereby, for example, the storage service 302 may be a local storage drive (such as a hard drive or solid state drive) of a computer that may be tasked with storing data objects that are computer-readable files.

The customer 304 may access data objects 306 (singularly referred to herein as data object 306) retained by the storage services. As used herein, accessing a data object 306 may include providing the data object 306 for storage in the storage service 302, retrieving the data object 306 from the storage service 302, modifying data content of the data object 306, moving the data object 306 to another storage location outside or within the storage service 302 or deleting the data object 306, among others. Further, similar actions may be taken with respect to a version of the data object 306. For example, a version of the data object 306 may be deleted or modified, whereby the modified version may be assigned a new version number.

The customer 304 provides a policy 308 for data object 306 retention. The policy may specify temporal criteria for retaining the data object 306. For example, the policy 308 may specify that a version of the data object 306 may become eligible for a certain action to be taken after a specified period of time has elapsed. The period of time (referred to herein as a timespan) may be measured from a specified timestamp, such as the point in time at which the data object 306 was provided for storage in the storage service 302, and the action may include deleting the data object 306 or moving the data object to another storage service, such as moving the data object 306 to be archived in an archival storage service. In addition, for various versions of the data object 306, the policy 308 may specify a non-current timespan following the expiration of which an action may be taken with respect to the data object 306. The non-current timespan may be measured from a point in time at which the version of the data object 306 became non-current, which may be the same as the point in time at which a subsequent version (or successor version) of the data object 306 was created. The policy may be applicable to a certain data object 306 and associated versions, a grouping of data objects 306, the data objects 306 of a partition or all the data objects 306 pertaining to the customer 304. In addition, the policy 308 may specify other criteria, such as a maximum number of or a range of versions to be retained for a data object 306 as well as one or more actions that may be taken on a version of a data object 306 that satisfies a criterion.

The storage service 302 retains the policy 308 provided by the customer 304. In FIG. 3, the policy 308 is shown to specify that the current version age associated with the data object to which the policy 308 pertains is three days. Thus according to the policy 308 a data object 306 may become eligible for an action to be taken with respect to the data object 306 (such as deleting the data object 306) once three days elapse from a timestamp associated with the data object 306 (for example, a creation time of the data object 306). In some embodiments, the current version age may only be applicable to a most recent version of a data object 306. Previous versions of the data object 306 may be subject to the non-current timespan criteria specified in the policy 308.

As described herein, a non-current timespan for a version of a data object 306 may be a measure of a length of time during which the version became outdated or was succeeded by a subsequent version. Accordingly, the non-current timespan of a version of the data object 306 may be represented as the difference between a present time (at the time when the measurement is performed) and a creation time of a version of the data object 306 succeeding the non-current version. As described herein, alternatives to the creation time include the time at which the customer 304 provided the version to the storage service 302 or the time of receipt, by the storage service 302, of the version of the customer, among others. It is also recognized that in distributed systems or client-service or client-server models, various time references or time-keeping mechanisms may be employed by various actors. Accordingly, any one of the time references may be used for criteria evaluation.

The storage service 302 retains for each version of the data object 306 of the customer 304 (for example, each data object 306 that is stored by the storage service 302) a key 310. As described herein, the key 310 is assigned to the data object 306 such that the versions of each data object 306 may be walked through or inspected in a forward or reverse order with respect to their successive versions. It is noted that reversing the order of a list is relatively inexpensive from a computational point of view. Accordingly, the key 310 may be assigned to either cause the versions of the data object to be sorted in an increasing or decreasing order, whereby order reversal may be performed in a computationally efficient manner. As shown in FIG. 3 listing the keys 310 in an increasing order results in the associated versions of the data object 306 to be listed in the reserve order of their version number.

Furthermore, the storage service 302 retains for each version of the data object 306, a timestamp 312 that may represent a creation time, upload time (for example, the time when the upload began or the time when the upload was completed) or modification time, among others. The timestamp 312 may be used to evaluate temporal criteria specified in the policy 308 and determine whether one or more actions may be performed on the version of the data object 306. In addition, the storage service 302 maintains a data object identity 314 and a version number 316 for each data object. The identity 314 and version number 316 may be customer 304 facing parameters and may be used by the customer 304 to identify various data object versions associated with customer 304. For proper operation, the storage service 302 associates the identity 314 and version number 316 with the key 310 pertaining to the version of the data object.

As described herein, the policy 308 specifies non-current timespan eligibility criteria that may be used to determine whether one or more actions are to be performed on a version of a data object 306. As shown in FIG. 3, the non-current timespan eligibility criteria specifies that a version is to be deleted by the storage service 302 (for example, without prior notification to or approval or acknowledgement from the customer 304) if the version's associated non-current timespan 320 is greater than 5 days. The non-current timespan may be calculated as the difference between a time measurement reflecting the present time (for example, as measured by a time counter 318 of the storage service 302) and a timestamp 312 (for example, reflecting the creation time or upload time, among others) of the data object version succeeding the data object of interest. Because version number 4 is the most recent version of the data object, version number 4 does not have a succeeding version and, accordingly, does not qualify for any action based at least in part on its non-current timespan. For version number 3, however, the non-current timespan may be calculated as 2 days, which is the difference between the time counter 318 measurement (20 days) and the timestamp (18 days) of its succeeding version (version number 4). Because the non-current timespan is less than 3 days, version number 3 does not satisfy the criteria for deletion and, accordingly, version number 3 may not be deleted. The non-current timespans 320 of version numbers 2 and 1 are 5 days and 1 hour and 9 days, 14 hours and 5 minutes, respectively, and, accordingly, these versions satisfy the criteria for deletion and may be deleted.

It is noted that upon detecting that a data object version is eligible for an action to be performed, such as deletion, the data object version may be tagged for the action to be performed and a second walk through may be done to perform the action. This procedure is advantageous because it ensures that non-current timespan 320 calculation of other data object versions is not biased or affected. For example, if version number 2 is deleted prior to calculating the non-current timespan 320 of version number 1, the non-current timespan 320 of version number 1 will be calculated as 5 days and 1 hour instead of 9 days, 14 hours and 5 minutes as the succeeding version number 1 will become version number 3 instead of version number 2.

Accordingly, following calculating non-current timespans 320 of the various versions, the list of data objects and their associated versions may be reversed based at least in part on the assigned key 310 and the list may be stepped through in a reverse order as that shown in FIG. 3 to perform the require deleting action. As such, proper computation of the non-current timespan 320 may not be affected.

It is noted that the non-current timespan 320 may advantageously be calculated at the time action may be taken on criteria specified by the policy and may not be required to be retained for every version of a data object. The customer 304 may, for example, unilaterally delete a particular version of a data object. If the non-current timespan 320 is retained for all versions prior to the action by the customer 304, the non-current timespan 320 may become "stale" in light of the action and the non-current timespans 320 may be required to be recalculated for all versions. Accordingly, for computational efficiency, the non-current timespan 320 may be calculated in real-time or "on the fly" as keys 310 pertaining the data objects are stepped through to determine satisfaction of policy eligibility criteria. The order of the keys 310 may then be reversed and the keys 310 may be inspected in the reversed order to perform an action, such as deleting the key and associated data object.

Figure 4:
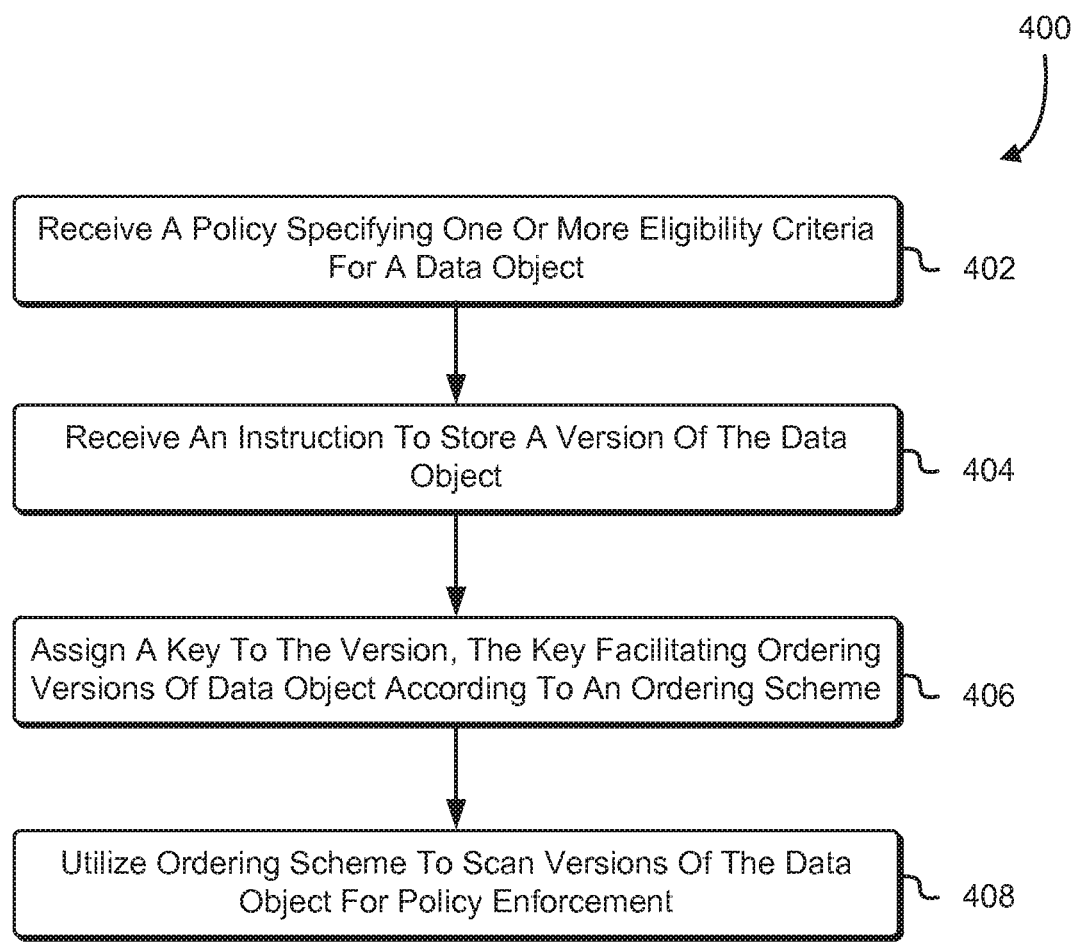
FIG. 4 shows a method for assigning a key to a data object version in accordance with at least one embodiment.

FIG. 4 shows a method for assigning a key to a data object version in accordance with at least one embodiment. In the process 400, a storage service, such as the storage service described with reference to numeral 302 in FIG. 3, receives 402 a policy specifying one or more eligibility criteria for a data object. The eligibility criteria may be one or more conditions whose satisfaction triggers one or more action to be taken with respect to the data object or a version thereof. As described herein, the eligibility criteria may specify a current version age for a data object, which may be a time period (as measured from a timestamp, such as an initiation of the upload of the data object) that a most recent version of the data object is retained. Further, the eligibility criteria may specify a non-current timespan for versions of the data object. If a version of the data object satisfies the eligibility criteria, the version may be subject to an action, such as relocation or deletion.

The storage service then receives 404 an instruction to store a version of the data object. Upon receiving the instruction, the storage service assigns 406 a key to the version, whereby the key facilitates ordering versions of data object according to an ordering scheme. As described herein, the key may be a string of characters, such as alphanumeric character, or symbols, among others. Further, the key may be used to list versions of the data object according to a desired ordering scheme, such as newest to oldest or oldest to newest, among others. The storage service then utilizes 408 the ordering scheme to scan versions of the data object for policy enforcement. The ordering scheme may be used to list the various versions of the data object according to their version number, and, accordingly, facilitates walking through the version of the data object for policy enforcement. It is noted that in various embodiments, the order of the occurrence of various elements of the process 400 may be different that described with reference to FIG. 4. For example, receipt of the instruction to store the version of the data object or assignment of a key to the version may occur prior to receiving the policy.

Figure 5:
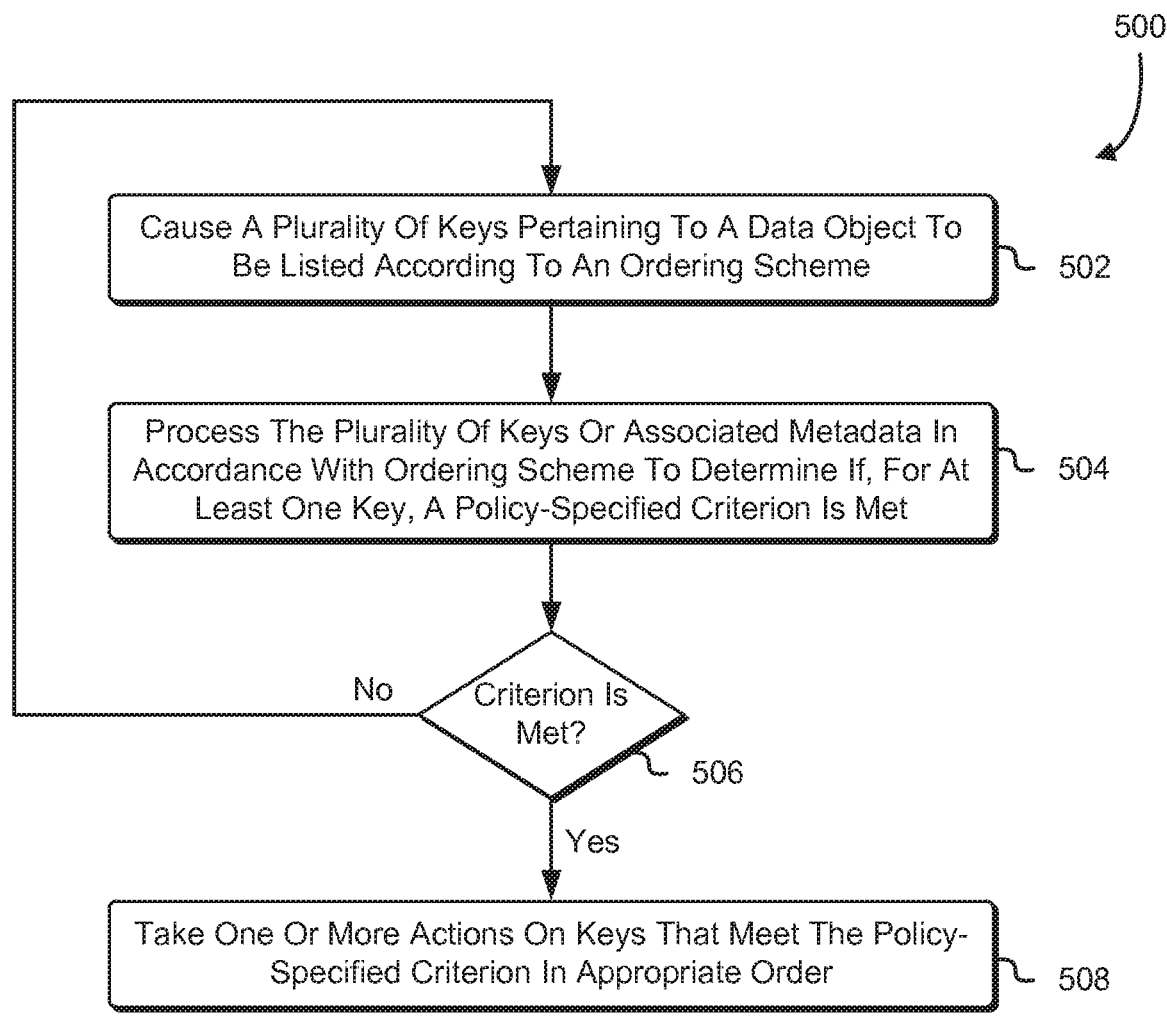
FIG. 5 shows an example of a method for utilizing an ordering scheme of keys for policy enforcement in accordance with at least one embodiment.

FIG. 5 shows an example of a method for utilizing an ordering scheme of keys for policy enforcement in accordance with at least one embodiment. In the process 500, a storage service, such as the storage service described with reference to numeral 302 in FIG. 3, causes 502 a plurality of keys pertaining to a data object to be listed according to an ordering scheme. The storage service then processes 504 the plurality of keys or associated metadata in accordance with ordering scheme to determine if a policy-specified criterion is met for at least one key. As described herein, the metadata for a key may include various timestamps. Further, scanning a plurality of keys may include performing a "walk through" of the plurality of keys according to their respective order and calculating a temporal measure, among others, associated with each key of the plurality of keys.

If a positive determination 506 is made, the storage service takes 508 one or more actions on keys that meet the policy-specified criterion in appropriate order, whereby the order may be a reverse order. For example, an end of a list of the plurality of keys may be identified and the one or more actions may be taken starting from and the end and proceeding to the beginning. As may be recognized, reserving the order of a list may be performed in a computationally efficient manner. The one or more actions may include removal of a key and the key's associated data object version from the storage service. Alternatively, some actions may be taken in the forward order as opposed to the reverse order. Deletion of keys may be performed in the reverse order, whereas rendering a current version of a data object non-current (for example, using a delete marker) may be performed in the forward order. In some embodiments, if a key pertaining to a version of a data object meets the policy-specified criterion, all keys succeeding the key that pertain to the data object will also meet the criterion. Accordingly, one or more actions may be taken on the keys or associated versions in the reverse order. In alternative embodiments, prior to performing the one or more actions, further searching may be performed to identify one or more data object versions that meet the policy-specified criterion.

Figure 6:
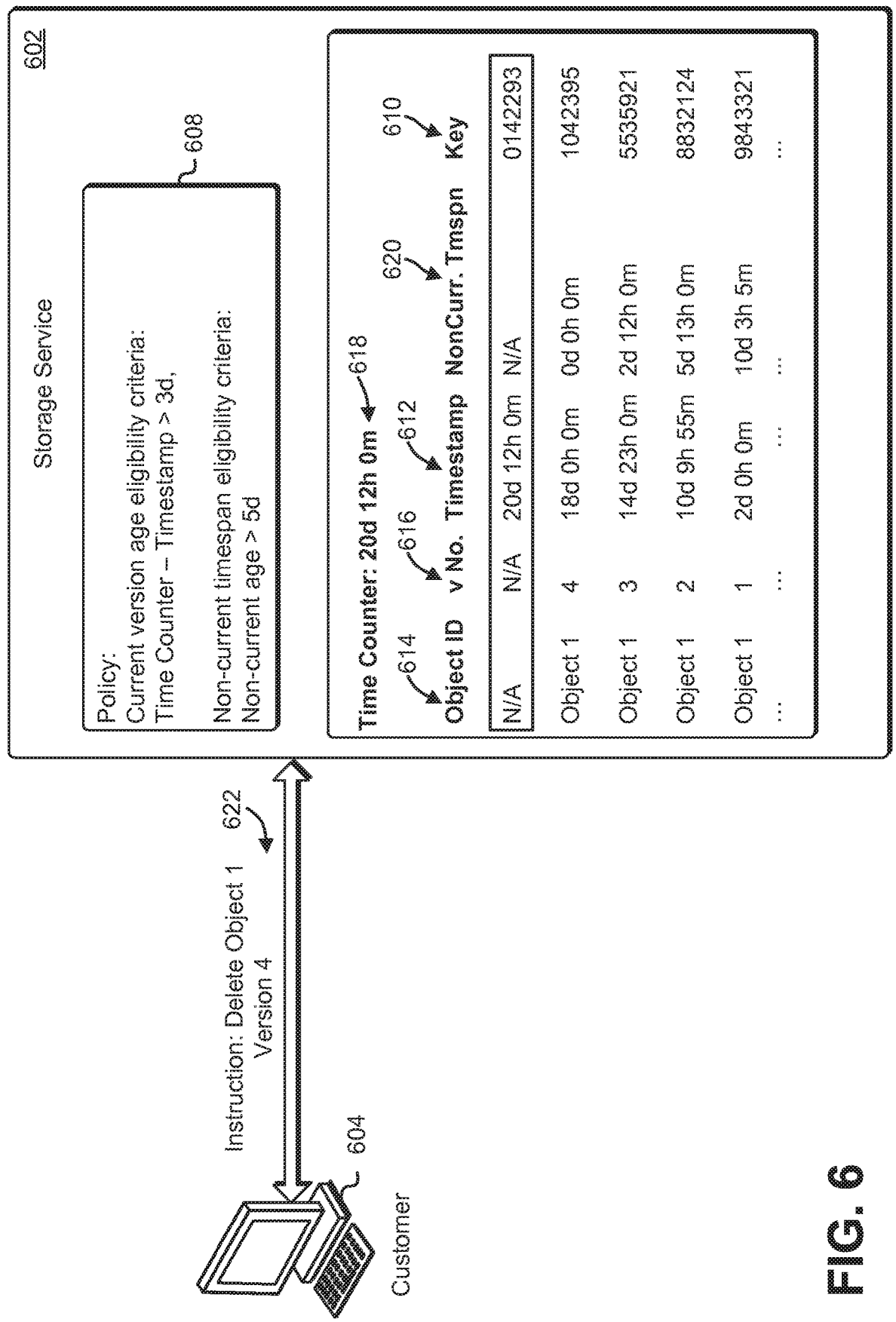
FIG. 6 shows an example of a customer in communication with a storage service in accordance with at least one embodiment.

FIG. 6 shows an example of a customer in communication with a storage service in accordance with at least one embodiment. The entities shown in FIG. 6 are similar to those described with reference to FIG. 3 herein, whereby a policy 608 is retained by the storage service 602 for four versions (denoted as version numbers 616 1-4) of a data object ID 614 (denoted as object 1) of the customer 604. The customer 604 seeks to delete the data object and sends an instruction 622 to the storage service specifying that the data object is to be deleted. The instruction 622 may specify the version of the data object sought to be deleted. Alternatively, if a version is not specified, the instruction 622 may be interpreted to indicate that the latest version of the data object is to be deleted. As measured by the time counter 618, the instruction 622 is initiated by the customer 604 or received by the storage service 602 at 20 days and 12 hours.

To cause the data object to be deleted, the storage service 602 generates a marker having an associated key 610 for the instruction 622. The marker may serve as an indicator that an action associated with the data object is requested and may be used for calculating various timespans for versions of the data object. Unlike a data object key, the key 610 associated with the marker may not have a specific data object version to which it pertains, whereby, for example, deletion of the key 610 would mean or necessitate deleting the associated data object version. Further, the key 610 may have associated metadata that indicates the fact that the key 610 pertains to a marker.

Similar to a data object key, the marker key may be generated in a manner that facilitates listing or sorting the marker key in accordance with an ordering scheme. As shown in FIG. 6, the marker is assigned a key that reflects the timestamp of 20 days and 12 hours associated with the marker and facilitates ordering the marker key together with the keys of the data object versions in accordance with their associated timestamps 612. The generation of the marker key and the utilization of the timestamp associated with the marker key for calculating the non-current timespan 620 of version number 616 4 of the data object renders the version non-current as of the timestamp associated with the marker. Accordingly, version number 616 4 would qualify to be evaluated according to the non-current timespan criteria (and thus may be deleted after 5 days). That is in contrast to the case prior to receipt of the instruction 622, whereby version number 616 4 would only qualify to be evaluated for the current version age criteria of the policy.

In accordance with FIG. 6, the instruction 622 to delete a data object renders the most recent version of the data object non-current as of receipt of the instruction. The status of prior versions of the data object remains the same as these versions were made non-current as of the creation of the latest version or due at least in part to the existence of the latest version. All versions of the data object are then eligible for deletion based at least in part on the non-current timespan criterion.

It is noted that without receipt of instruction 622, version number 616 4 of the data object would have become non-current when the time counter 618 reached 21 days due to the fact that at that time, version number 616 4 satisfies the current version age criterion of the policy 608. Accordingly, at that time and without receipt of the instruction 622, a marker and associated key 610 would be generated for version number 616 4 in order to render the version non-current and eligible for deletion based at least in part on the non-current timespan criterion of the policy. Performing criteria evaluation for marker insertion may be done periodically or according to a schedule. Further, it may be desirable to unify the timestamp associated with marker by setting the timestamp to a specified time for every iteration. Setting the timestamp to the specified time may be advantageous in that the insertion of duplicate markers may be prevented. For example, if criteria evaluation is performed daily, the timestamp of all markers generated during that daily iteration may be set to midnight Greenwich Mean Time (GMT).

Accordingly, the techniques described herein may be used to implement a recycle bin model for data objects maintained by the storage service 602, whereby a newer version of the data object enters the recycle bin due at least in part to meeting the current version age criterion or an explicit instruction from the customer 604. Versions of the data object remain in the recycle bin until they meet the non-current timespan criteria at which point, an action, such as deletion, may be taken. The techniques described herein are advantageous in that two temporal windows are implemented to protect data objects from accidental or unintentional deletion from the storage service 602. The techniques described herein are also advantageous in that an accidental instruction 622 to delete a data object version may be undone or reversed within the non-current timespan 620 specified in the policy 608.

As described herein, an ordered set of keys may be scanned in accordance with an ordering scheme to identify whether data objects or metadata pertaining to the keys satisfies a criterion. Subsequently, if at least one data object or metadata is found to satisfy the criterion, the ordered set may be reversed and the keys may be visited in the reverse order to perform an action such as key and data object deletion. Even though reversing an ordered set of keys is relatively computationally efficient, as the size of the set (number of elements of the set) increases the computational efficiency of performing the reversal decreases. A large-sized set may be divided into smaller sets and the smaller sets may be individually reversed to reduce computational complexity.

Figure 7:
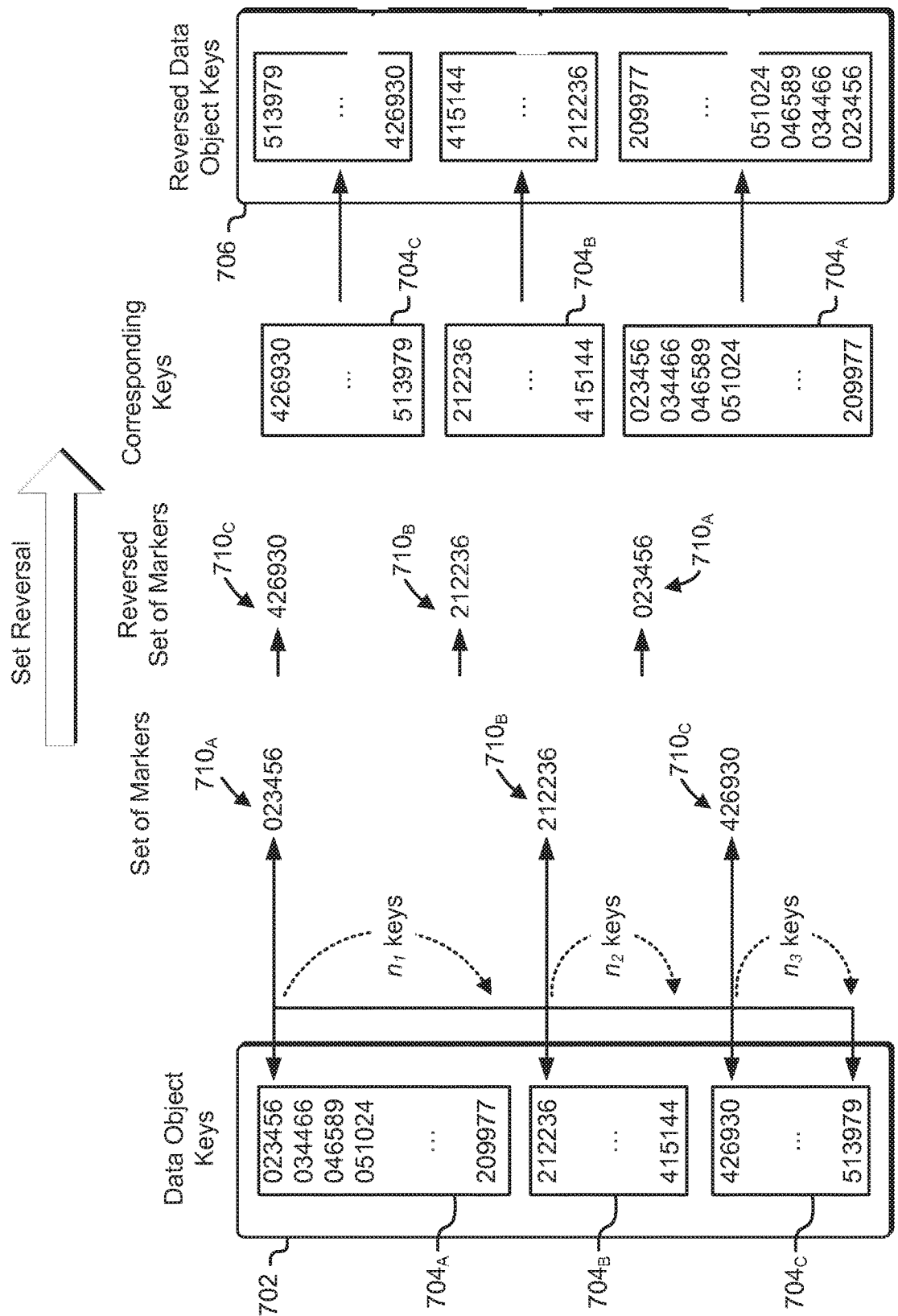
FIG. 7 shows an example of key set division and reversal in accordance with at least one embodiment.

FIG. 7 shows an example of key set division and reversal in accordance with at least one embodiment. An ordered set of keys 702 is divided into a plurality of subsets $704_{A-C}$ (singularly referred to herein as subset 704). As shown in FIG. 7, a first subset $704_A$ comprises $n_1$ keys, a second subset 7048 comprises $n_2$ keys and a third subset $704_C$ comprises $n_3$, where $n_1$, $n_2$ and $n_3$ may be positive integers having equal or different values. To identify the subsets, the set of keys 702 may be processed and a counter may be used to count the number of processed keys. Further, a tagging mechanism may be used to tag a key that corresponds to a specified count, such as any multiple of an integer n. The tags may, accordingly, mark the beginning or an end of a subset 704. As shown in FIG. 7, a set of markers $710_{A-C}$ are used to tag the beginning of corresponding subsets $704_{A-C}$ of keys.

To produce a set of reversed data object keys 706, the set of markers $710_{A-C}$ may be stored in memory. It is noted that because the set of markers $710_{A-C}$ are smaller in size compared to the set of data object keys 702, the set of markers $710_{A-C}$ may require a relatively smaller amount of memory for storage. The order set of markers $710_{A-C}$ may then be reversed as shown in FIG. 7 to produce a reversed set of markers, whereby each marker $710_{A-C}$ may be have an associated subset of keys $704_{A-C}$. The associated subset of keys $704_{A-C}$ may then be reversed to produce the reversed data object keys 706.

Figure 8:
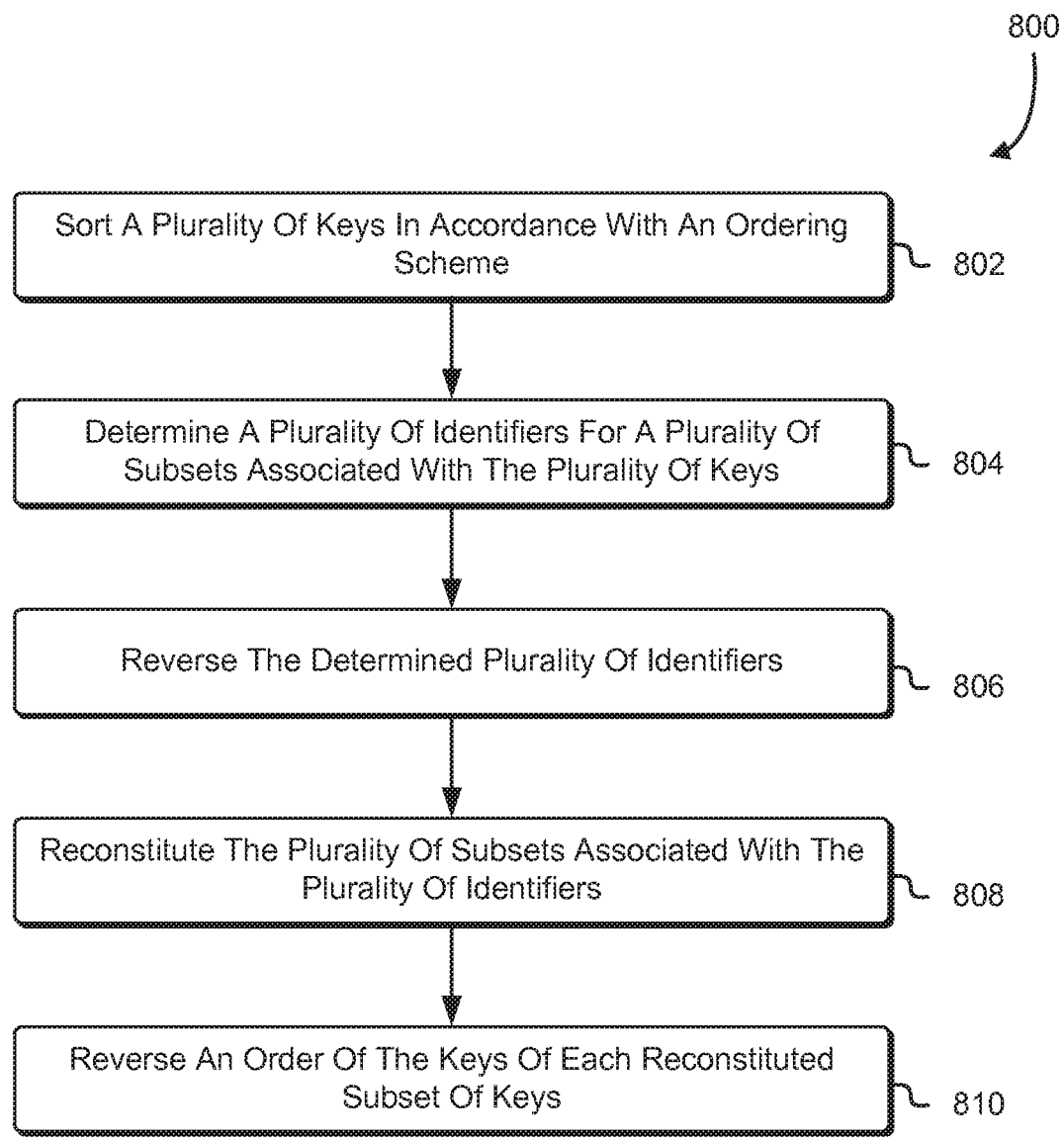
FIG. 8 shows an example of a method for reversing an order of a plurality of keys in accordance with at least one embodiment.

FIG. 8 shows an example of a method for reversing an order of a plurality of keys in accordance with at least one embodiment. In the process 800, a criteria evaluation engine, such as the criteria evaluation engine 1106 or the criteria reevaluation engine 1112 described with reference to FIG. 11, sorts 802 a plurality of keys in accordance with an ordering scheme. The criteria evaluation engine then determines 804 a plurality of identifiers for a plurality of subsets associated with the plurality of keys. As described herein, the identifiers may be markers that may be used to determine the members of the plurality of subsets. An identifier may, for example, be a first key or a last key of a subset of the plurality of keys. As described herein, the plurality of subsets may each have a fixed or a variable number of keys. Further, the plurality of subsets may be ordered in a similar manner as the keys of each subset.

The criteria evaluation engine reverses 806 the order of the determined plurality of identifiers. The criteria evaluation engine also reconstitutes 808 the plurality of subsets associated with the plurality of identifiers as described with reference to FIG. 7 herein. The criteria evaluation engine then reverses 810 an order of the keys of each reconstituted subset of keys to produce the plurality of the keys in a reversed order.

Figure 9:
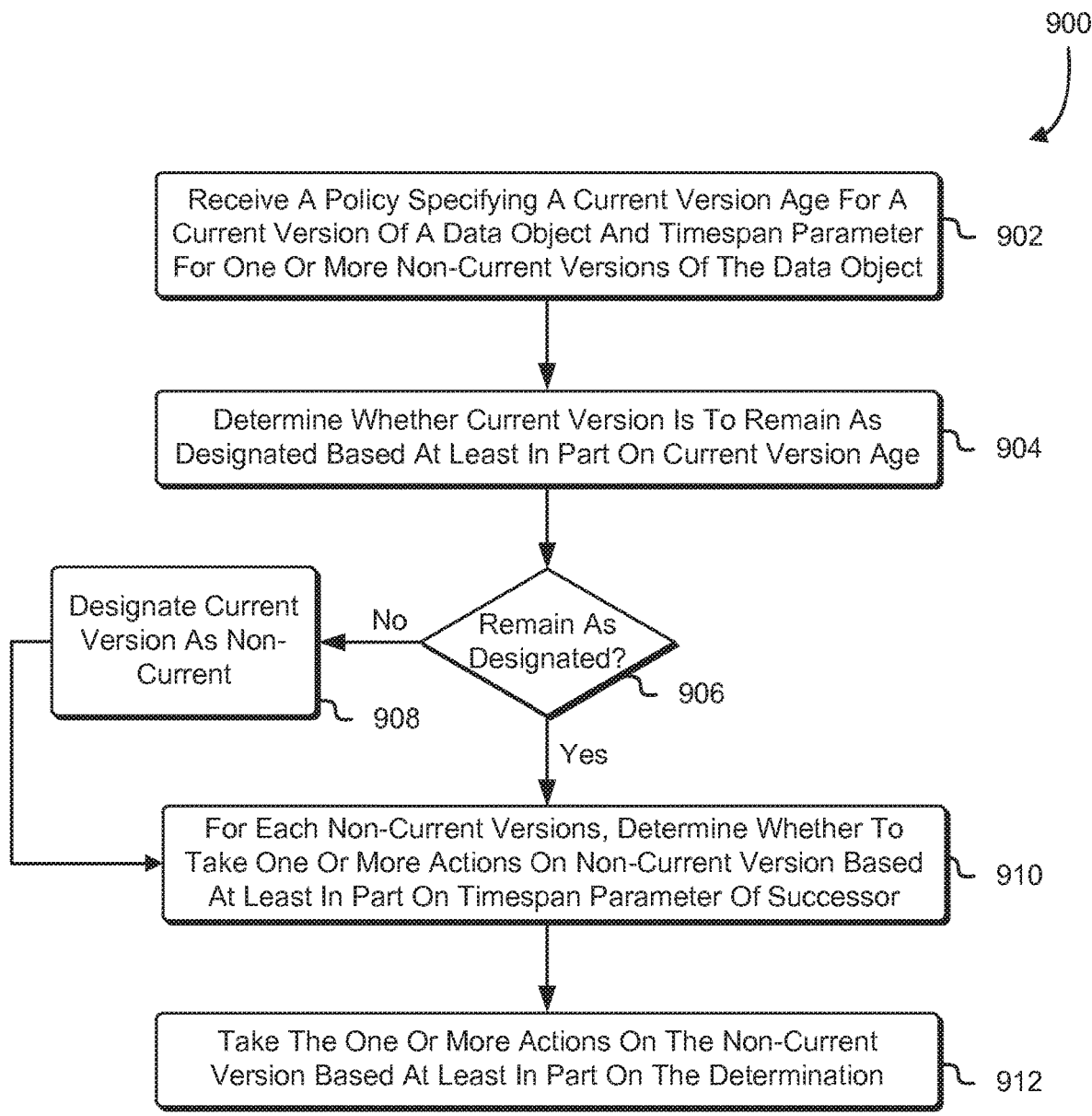
FIG. 9 shows an example of a method for evaluating temporal parameters of a version of a data object.

FIG. 9 shows an example of a method for evaluating temporal parameters of a version of a data object. In the process 900, an evaluation engine, such as the criteria evaluation engine 1106 or the criteria reevaluation engine 1112 described with reference to FIG. 11, receives 902 a policy specifying a current version age parameter for a current version of a data object and timespan parameter for one or more non-current versions of the data object. The current version age parameter may specify an amount of time following the expiration of which a current version of the data object is to be designated as non-current. The timespan parameter may specify a maximum amount of time that a non-current version of the data object may be stored prior to action, such as deletion or removal, may be taken with respect to the non-current version.

The evaluation engine determines 904 whether the current version is to remain as designated as such based at least in part on the current version age parameter. If the evaluation engine determines 906 that the current version should not retain the designation, the evaluation engine designates 908 the current version as being a non-current version. Conversely, if the evaluation engine determines 906 that the current version should retain the designation, the evaluation engine determines 910 (for each non-current version of the data object) whether to take one or more actions on non-current version based at least in part on the timespan parameter of a successor version. The evaluation engine takes 912 one or more actions on the non-current version based at least in part on the determination.

In some embodiments, a customer of a storage service may perform multi-part upload of a data object, whereby the data object is segmented in portions and each portion is uploaded independently of the other portions. When all the portions have been provided to the storage service, the customer may send indication that the multi-part upload has been completed. The multi-part upload may, for example, be performed when the size of the data object is large and the multi-part upload may occur over a long period of time. In a multi-part upload, portions of the data object may have different creation times, whereby, for example, the upload initiation times of the various portions of the data object may be each considered as a creation time of the data object. To prevent a data object version from being designated as non-current or deleted while the data object version is being uploaded in multiple parts, a check is performed to determine whether the data object version has an outstanding portion that is yet to be received as part of a multi-part upload. If it is determined that the data object version has an outstanding portion and the upload is not yet complete, the data object version may not be considered as a candidate for its designation to be changed to non-current or deleted.

Figure 10:
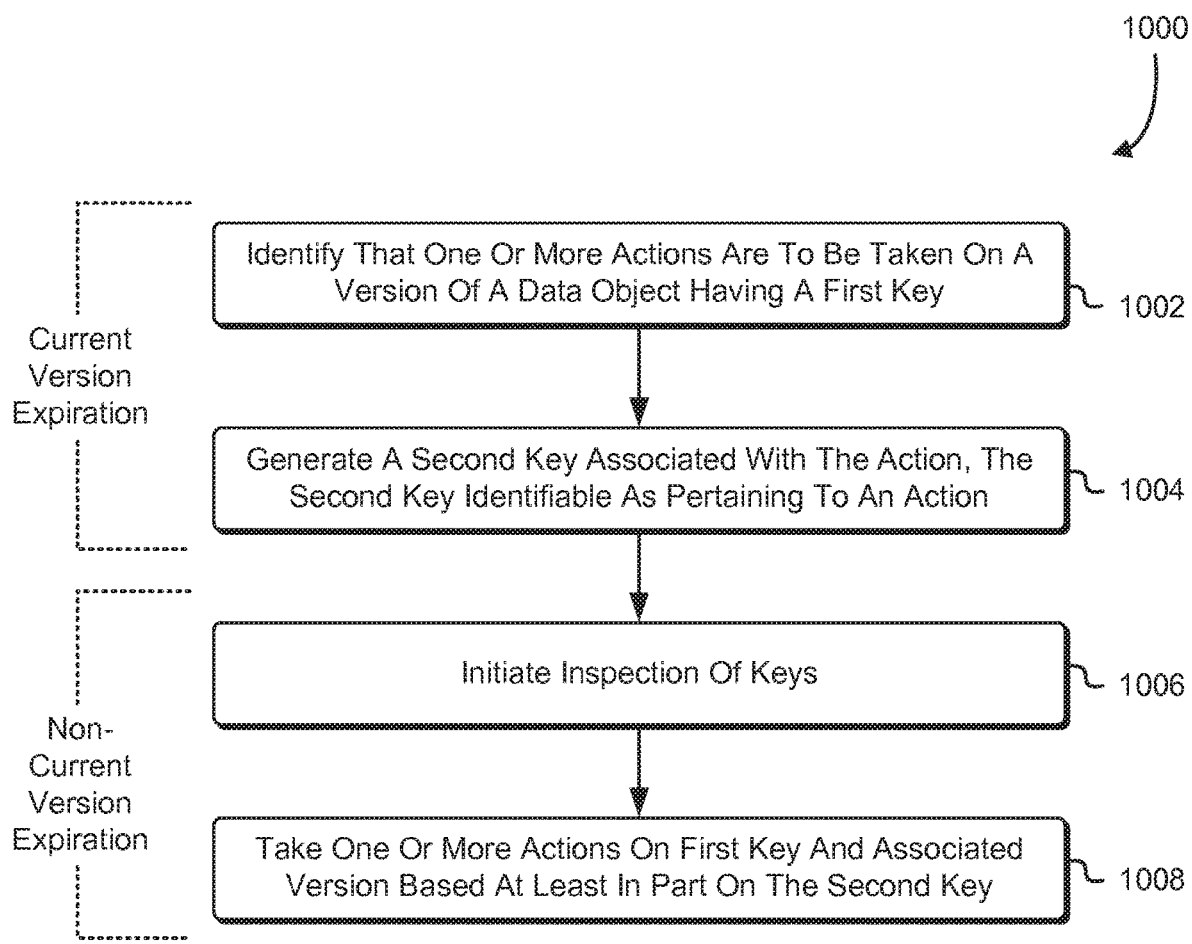
FIG. 10 shows an example of a method for utilizing a key to indicate that one or more actions are to be taken with respect to a data object version in accordance with at least one embodiment.

FIG. 10 shows an example of a method for utilizing a key to indicate that one or more actions are to be taken with respect to a data object version in accordance with at least one embodiment. In the process 1000, an evaluation engine, such as the criteria reevaluation engine 1112 described with reference to FIG. 11, identifies 1002 that one or more actions are to be taken on a version of a data object having a first key. The evaluation engine generates 1004 a second key associated with the action, whereby the second key may be identifiable as pertaining to an action. Identifying that one or more actions are to be taken on the version of the data object and generating the second key associated with the action may be performed as part of current version expiration.

As described herein, the second key may be used to render a current version non-current or change a lifespan associated with key so as to permit deletion or removal of the version of the data object associated with the key. The evaluation engine then initiates 1006 key inspection as described herein. For example, the evaluation engine may cause the keys to be sorted to facilitate performing a "walk through." The evaluation engine then takes 1008 one or more actions on the first key and the version associated with the first key based at least in part on the second key. Further, initiating key inspection and taking the one or more actions on the first key may be performed as part of non-current version expiration.

Figure 11:
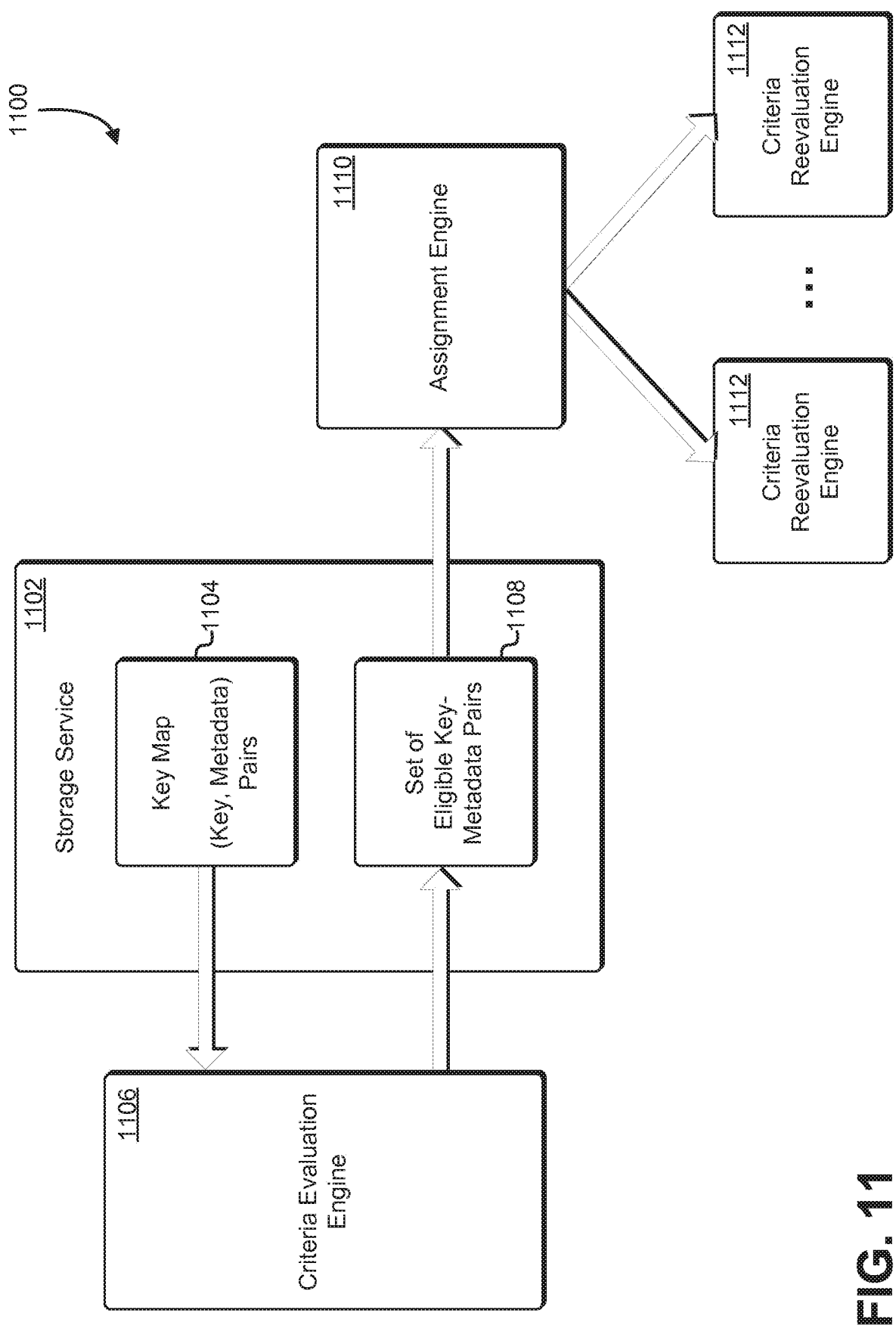
FIG. 11 shows an example of an environment for criteria eligibility evaluation in accordance with at least one embodiment.

FIG. 11 shows an example of an environment for criteria eligibility evaluation in accordance with at least one embodiment. In the environment 1100, a storage service 1102 stores a key map 1104 pertaining to a plurality of data objects that are retained by the storage service 1102. As described herein, the key map 1104 may, for each data object or version thereof, retain a key and metadata associated with the key that may include a timestamp representing the time of an initiation of an upload of the data object version. The key and related metadata may be retained for every data object retained by the storage service 1102, for example, all data objects for all customers of the storage service 1102 or in all customer partitions.

A criteria evaluation engine 1106 retrieves the key map 1104 from the storage service 1102. The criteria evaluation engine 1106 may be configured to evaluate the key map 1104 and determine whether the keys pertaining to a data object satisfies one or more specified criteria. For example, the criteria evaluation engine 1106 may have access to customer policies described herein and may evaluate the keys or their associated metadata to determine whether the keys meet a specified criterion. As described herein, the construction of the keys facilitates ordering the keys according to an ordering scheme, whereby, for example, the keys may be ordered by a customer identifier, partition identifier or a timestamp associated with the key. The criteria evaluation engine 1106 may step through the ordered keys of the key map 1104 and identify one or more keys that satisfy a specified criterion. Because the specified criteria may sometimes apply only to certain partitions, data objects or customers, the ordering of the keys described herein facilitates expedient identification of keys that meet a criterion. For example, keys pertaining to partitions or data objects that are not subject to a policy may be skipped through based at least in part on information present or coded in the key including a partition identifier or data object identifier.

Upon identifying one or more keys that meet the criteria, the criteria evaluation engine 1106 constructs a set of eligible key-metadata pairs 1108 and causes the set of eligible key-metadata pairs 1108 to be stored in the storage service 1102. The set of eligible key-metadata pairs 1108 may be a batch of a fixed or variable size, whereby it may include key-metadata pairs pertaining to one or more customers, partitions or data objects. It is noted that although one set of eligible key-metadata pairs 1108 is shown in FIG. 11, a plurality of sets may be stored in the storage service 1102.

An assignment engine 1110 retrieves the set of eligible key-metadata pairs 1108 from the storage service 1102 and assigns the set of eligible key-metadata pairs 1108 to one or more criteria reevaluation engines 1112 for criteria evaluation. The assignment engine 1110 may be configured to ensure fairness in the allocation of resources to customers. For example, the assignment engine 1110 may distribute one or more sets of eligible key-metadata pairs 1108 among the criteria reevaluation engines 1112 in a manner that ensures timely evaluation of keys associated with both high-volume customers and lower-volume customers.

As described herein, a criteria reevaluation engine 1112 performs a "walk through" or scans the set of eligible key-metadata pairs 1108 and determines whether a key of the set 1108 meets a criterion (for example, as specified in a policy). The criteria reevaluation engines 1112 may confirm the results of the evaluation first performed on the key map 1104 by the criteria evaluation engine 1106. It may be expected that if a criterion according to which a key was evaluated has changed, the key may be found not to meet the criterion upon subsequent evaluation by the criteria reevaluation engines 1112. The criteria reevaluation engines 1112 may take one or more actions on a data object version associated with a key found to meet the criterion. As described herein, whereas scanning the list for criteria evaluation may be performed according to an ordering scheme, the one or more actions, such as deletion or relocation of a data object, may be in the reverse order.

Upon completing criterion reevaluation, the engine 1112 provides an indication to the assignment engine 1110, which may in turn delete or remove the set of eligible key-metadata pairs 1108 from the storage service 1102. Further, if an action, such as a deletion is taken with respect to a data object version, the criteria reevaluation engine 1112 causes the key and associated metadata pertaining to the data object version to be removed from the key map 1104 maintained by the storage service 1102.

Figure 12:
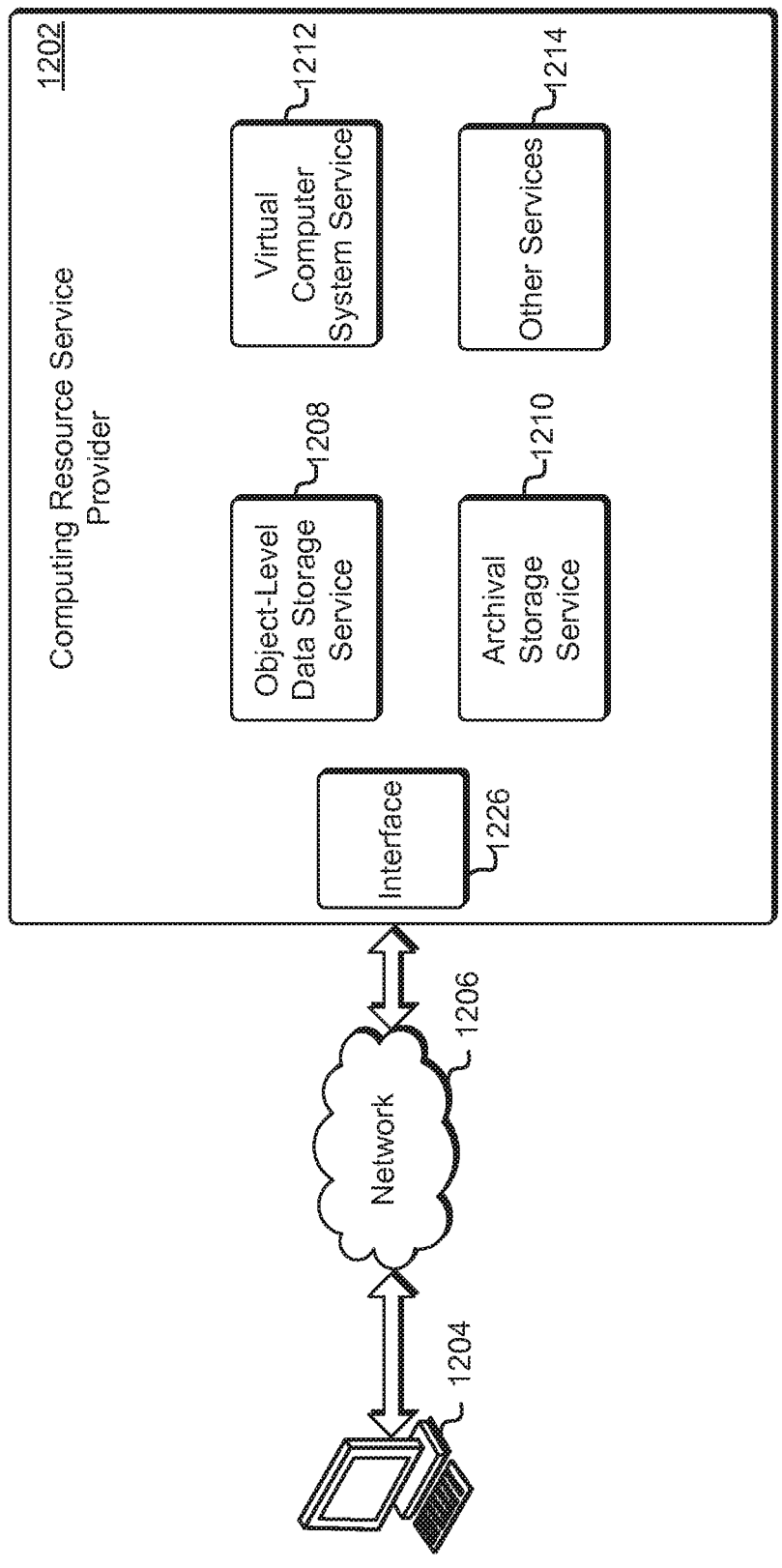
FIG. 12 shows an example of a customer connected to a computing resource service provider in accordance with at least one embodiment.

FIG. 12 shows an example of a customer connected to a computing resource service provider in accordance with at least one embodiment. The computing resource service provider 1202 may provide a variety of services to the customer 1204 and the customer 1204 may communicate with the computing resource service provider 1202 via an interface 1226, which may be a web services interface or any other type of customer interface. While FIG. 12 shows one interface 1226 for the services of the computing resource service provider 1202, each service may have its own interface and, generally, subsets of the services may have corresponding interfaces in addition to or as an alternative to the interface 1226. The customer 1204 may be an organization that may utilize one or more of the services provided by the computing resource service provider 1202 to maintain and deliver information to its employees, which may be located in various geographical locations. Additionally, the customer 1204 may be an individual that utilizes the services of the computing resource service provider 1202 to deliver content to a working group located remotely. As shown in FIG. 12, the customer 1204 may communicate with the computing resource service provider 1202 through a network 1206, whereby the network 1206 may be a communication network, such as the Internet, an intranet or an Internet service provider (ISP) network. Some communications from the customer 1204 to the computing resource service provider 1202 may cause the computing resource service provider 1202 to operate in accordance with one or more embodiments described herein or a variation thereof.

The computing resource service provider 1202 may provide various computing resource services to its customers. The services provided by the computing resource service provider 1202, in this example, include an object-level data storage service 1208, an archival storage service 1210, a virtual computer system service 1212 and one or more other services 1214. It is noted that not all embodiments described herein include the services 1208-1214 described with reference to FIG. 12 and additional services may be provided in addition to or as an alternative to services explicitly described herein. As described herein, each of the services 1208-1214 may include one or more web service interfaces that enable the customer 1204 to submit appropriately configured API calls to the various services through web service requests. In addition, each of the services may include one or more service interfaces that enable the services to access each other (e.g., to enable a virtual computer system of the virtual computer system service 1212 to store data in or retrieve data from the object-level data storage service 1208 and/or to access data stored in the archival storage service 1210).

The object-level data storage service 1208 may be a collection of computing resources configured to synchronously process requests to store and/or access data. As used herein, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests and/or other such requests from other services within the computer system.

The object-level data storage service 1208 may operate using computing resources (e.g., databases) that enable the object-level data storage service 1208 to locate and retrieve data quickly, so as to allow data to be provided in responses to requests for the data. For example, the object-level data storage service 1208 may maintain stored data in a manner such that, when a request for a data object is retrieved, the data object can be provided (or streaming of the data object can be initiated) in a response to the request. Data stored in the object-level data storage service 1208 may be organized into data objects. The data objects may have arbitrary sizes except, perhaps, for certain constraints on size. Thus, the object-level data storage service 1208 may store numerous data objects of varying sizes. The object-level data storage service 1208 may operate as a key value store that associates data objects with identifiers of the data objects which may be used by the customer 1204 to retrieve or perform other operations in connection with the data objects stored by the object-level data storage service 1208.

The computing resource service provider 1202 further includes an archival storage service 1210. The archival storage service 1210 may comprise a collection of computing resources that collectively operate to provide storage for data archiving and backup of customer data. As used herein, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests and/or other such requests from other services within the computer system.

The data may comprise one or more data files that may be combined to form an archive. The archival storage service 1210 may be configured to persistently store data that may be infrequently accessed and for which long retrieval times are acceptable to a customer utilizing the archival storage service 1210. A customer may interact with the archival storage service 1210 (for example, through appropriately configured API calls made to the archival storage service 1210) to generate one or more archives, upload and retrieve the one or more archives or monitor the generation, upload or retrieval of the one or more archives.

The virtual computer system service 1212 may be a collection of computing resources configured to instantiate virtual machine instances on behalf of the customer 1204. The customer 1204 may interact with the virtual computer system service 1212 (via appropriately configured and authenticated API calls) to provision and operate virtual computer systems that are instantiated on physical computing devices hosted and operated by the computing resource service provider 1202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 1212 is shown in FIG. 12, any other computer system or computer system service may be utilized in the computing resource service provider 1202, such as a computer system or computer system service that does not employ virtualization or instantiation and instead provisions computing resources on dedicated or shared computers, servers and/or other physical devices.

The computing resource service provider 1202 additionally maintains one or more other services 1214 based at least in part on the needs of its customers 1204. For instance, the computing resource service provider 1202 may maintain a database service for its customers 1204. A database service may be a collection of computing resources that collectively operate to run one or more databases for one or more customers 1204. The customer 1204 may operate and manage a database from the database service by utilizing appropriately configured API calls. This, in turn, may allow a customer 1204 to maintain and potentially scale the operations in the database. Other services include, but are not limited to, services that manage and/or monitor other services.

Figure 13:
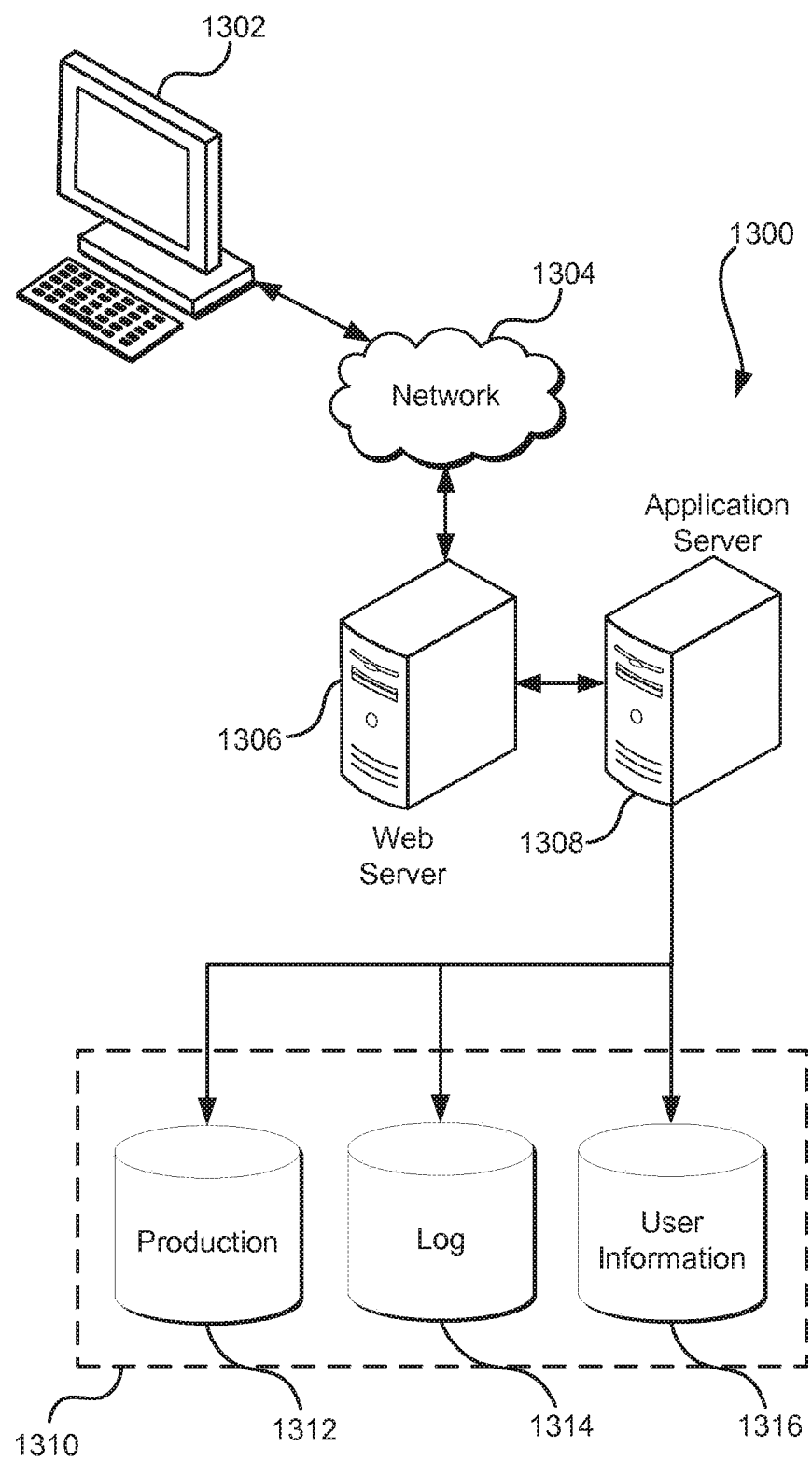
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and/or receive requests, messages or information over an appropriate network 1304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1302 and the application server 1308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1310 can include several separate data tables, databases, data documents, dynamic data storage schemes and/or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. The application server 1308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
receiving a request to enable versioning for data objects stored by a storage service, the request including a partition identifier associated with the storage service;
obtaining a first data object for storage associated with the partition identifier;
designating a first version number associated with the first data object to a current version and a first expiration of time to the first data object based at least in part on a policy associated with the partition identifier;
obtaining a second data object for storage associated with the partition identifier, the second data object designated as a new version of the first data object;
designating the first version number associated with the first data object as a non-current version; and
designating a second version number associated with the second data object as the current version and a second expiration of time to the second data object based at least in part on the policy associated with the partition identifier, the second expiration of time specifying a second interval of time after which the second data object can be deleted.

2. The computer-implemented method of claim 1, wherein the first expiration of time indicating a time at which the first data object can be deleted; and
wherein the computer-implemented method further comprises deleting the first data object and the first version number at a point in time after the expiration of the first expiration of time.

3. The computer-implemented method of claim 1, wherein the policy further includes a set of conditions where satisfaction of a first condition of the set of conditions causes an operation specified in the policy to be performed, where the first expiration of time is a member of the set of conditions.

4. The computer-implemented method of claim 3, wherein the policy further includes a second condition of the set of conditions, the second condition indicating a number of non-current versions associated with the partition identifier to be retained; and
wherein the computer-implemented method further comprises deleting, based at least in part on the policy, the first data object and the first version number as a result of designating the first version number as a non-current version and a number of non-current versions are greater than or equal to the maximum number of non-current versions associated with the partition identifier to be retained.

5. The computer-implemented method of claim 1, wherein the policy further includes a lifespan parameter indicating an interval of time after which an operation is performed on data objects stored in a storage location.

6. The computer-implemented method of claim 5, wherein the first expiration of time and the second expiration of time are determined based at least in part on the lifespan parameter.

7. A system, comprising:
one or more processors; and
memory storing instructions that, as a result of being executed by the one or more processors, cause the system to:
enable versioning for a first copy of a data object maintained by the system, based at least in part on a request including a partition identifier associated with a storage location for the data object, by at least:
generating first metadata associated with the first copy of the data object to indicate that the first copy of the data object is a current version of the data object, a first interval of time, and a first version identifier associated with the first copy of the data object, where the first version identifier identifies the first copy of the data object among a plurality of different versions of the data object and the first interval of time indicates a point in time at which the first copy of the data object may be deleted;
receive a second copy of the data object for storage by the system;
assign versioning information associated with the data object, based at least in part on a policy associated with the storage location, by at least:
altering the first metadata associated with the first copy of the data object to indicate that the first copy of the data object is a non-current version of the data object; and
assigning second metadata associated with the second copy of the data object to indicate that the second copy of the data object is the current version of the data object, a second interval of time indicating a point of time at which the second copy of the data object may be deleted, and a second version identifier; and
as a result of determining that the first interval of time has expired, cause the first copy of the data object to be deleted.

8. The system of claim 7, wherein the instructions that cause the system to enable versioning for the first copy of the data object further comprise instructions that, as a result of being executed by the one or more processors, cause the system to update the policy associated with the data object to indicate versioning is enabled and at least one condition of a set of conditions, including an indication of storage service for storage of data objects associated with the policy, a lifespan parameter, and a maximum number of non-current versions.

9. The system of claim 8, wherein the maximum number of non-current versions indicates a range of versions to retain.

10. The system of claim 7, wherein the first version identifier and the second version identifier are assigned numeric identifiers that reflect an order of creation of data objects associated with version identifiers.

11. The system of claim 7, wherein the instructions that cause the system to cause the first copy of the data object to be deleted further comprise instructions that, as a result of being executed by the one or more processors, cause the system to receive a request to delete copies of the data object older than a specified interval of time.

12. The system of claim 7, wherein the memory further includes instructions that, as a result of being executed by the one or more processors, cause the system to:
receive a request to revert the data object to a previous version; and
update the second metadata to indicate that the second copy of the data object is the non-current version and the first metadata to indicate that the first copy of the data object is the current version.

13. The system of claim 12, wherein the memory further includes instructions that, as a result of being executed by the one or more processors, cause the system to generate a determination not to delete the first copy of the data object as a result of the first metadata indicating that the first copy of the data object is the current version.

14. A non-transitory computer-readable storage medium storing thereon executable instructions that, as a result of being executed by one or more processors of a computer system, cause the computer system to:
- obtain a versioning policy associated with a data storage location maintained by the computer system, the versioning policy indicating a first condition of a set of conditions associated with data objects stored in the data storage location, the first condition including a lifespan associated with a data object or a number of non-current versions of the data object maintained under the versioning policy;
- obtain a first version of the data object for storage in the data storage location;
- assign first metadata associated with the first version of the data object to indicate that the first version of the data object is a current version and the first condition of the set of conditions of the versioning policy applies to the data object;
- obtain a second version of the data object for storage in the data storage location;
- assign second metadata associated with the second version of the data object to indicate that the second version of the data object is the current version and a second condition of the set of conditions of the versioning policy applies to the data object, where the second condition includes a lifespan of the second version of the data object;
- modify the first metadata to indicate that the first version of the data object is a non-current version; and
- as a result of determining that the first condition is satisfied and that the first version of the data object is the non-current version, cause an operation to be performed on the first version of the data object.

15. The non-transitory computer-readable storage medium of claim 14, wherein instructions that cause the operation to be performed on the first version of the data object further include instructions that, as a result of being executed by the one or more processors, cause the computer system to delete the first version of the data object.

16. The non-transitory computer-readable storage medium of claim 14, wherein instructions that cause the operation to be performed on the first version of the data object further include instructions that, as a result of being executed by the one or more processors, cause the computer system to move the first version of the data object to another a second computer system.

17. The non-transitory computer-readable storage medium of claim 16, wherein the second computer system is an archival storage system.

18. The non-transitory computer-readable storage medium of claim 16, wherein instructions that cause the computer system to move the first version of the data object to the second computer system further include instructions that, as a result of being executed by the one or more processors, cause the computer system to move the first version of the data object based at least in part on a third condition of the set of conditions of the versioning policy associated with the data storage location.

19. The non-transitory computer-readable storage medium of claim 14, wherein instructions that cause the operation to be performed on the first version of the data object further include instructions that, as a result of being executed by the one or more processors, cause the computer system to revert the first version of the data object by at least modifying the first metadata associated with the first version of the data object to indicate that the first version of the data object is the current version.

20. The non-transitory computer-readable storage medium of claim 19, wherein instructions further comprise instructions that, as a result of being executed by one or more processors of a computer system, cause the computer system to modify the second metadata associated with the second version of the data object to indicate that the second version of the data object is the non-current version.

* * * * *